Dec. 30, 1941.   F. C. FRANK ET AL   2,267,726
VALVE
Filed Feb. 27, 1939    4 Sheets-Sheet 1
Fig. 1
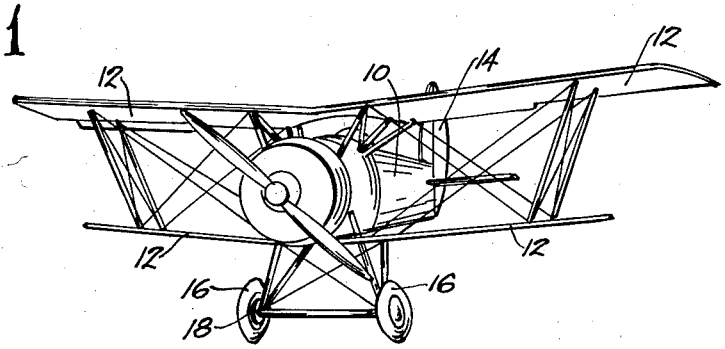
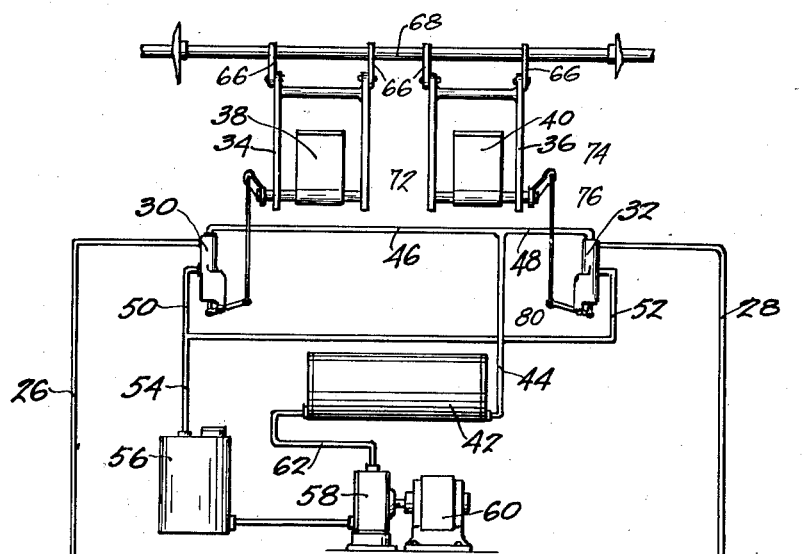
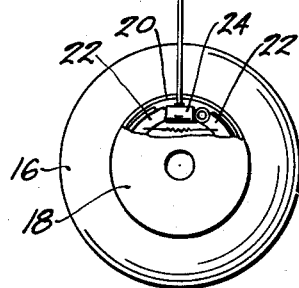
Fig. 2
INVENTORS.
FREDERICK C. FRANK
BY  WILLIAM H. DuBOIS
Jerome R. Cox
ATTORNEY.

Dec. 30, 1941. F. C. FRANK ET AL 2,267,726
VALVE
Filed Feb. 27, 1939 4 Sheets-Sheet 4

INVENTORS.
FREDERICK C. FRANK
BY WILLIAM H. DuBOIS
Jerome R. Cox
ATTORNEY.

Patented Dec. 30, 1941

2,267,726

UNITED STATES PATENT OFFICE 2,267,726

VALVE

Frederick C. Frank and William H. Du Bois, South Bend, Ind., assignors to Bendix Aviation Corporation, South Bend, Ind., a corporation of Delaware Application February 27, 1939, Serial No. 258,685

13 Claims. (Cl. 303—54)

This invention relates to regulating valves, especially adapted for use in controlling the brakes of an airplane.

The embodiments of our invention are disclosed in connection with an airplane and the brake operating system thereof and it is to be understood that our invention is especially fitted for such use.

One of the objects of our invention is the construction of a valve adapted to be used in connection with a brake operating system of an airplane.

A further object of our invention is the provision in a valve of a character described above of one or more balanced plungers so balanced by the action of a mechanical spring on one side and fluid pressure on the other to effect alternatively two phases of operation, one admitting more fluid to the system, and the other releasing some of the fluid to the return line.

A further object of the invention is the provision of a valve capable of obtaining a graduated release in exactly the same manner and with exactly the same degree of controllability as graduated application of the brakes.

A further object of the invention is a provision of a valve of this type providing consistency in action so that for a given pedal pressure the output of the brake is the same whether the valve is old or new, or whether the brake is being applied or released.

One of the features of this invention is the provision of two separate plungers with an inlet port in one and an outlet port in the other.

A further feature of the invention is the reliance entirely of metal plungers and cylinders, thus eliminating rubber cups and sealing washers which not only cause a certain amount of drag in the system, but which also may cause inconsistency in action by reason of the drag which may vary considerably due to swelling, the use of impure fluid, etc.

A further feature of the invention is the provision of a valve having only slight travel before the brakes start to operate and having a gradual build-up in brake applying pressure after the brakes start to operate.

A further feature of the invention is the provision of a valve in which the pedal pressure varies substantially as the pedal position. Thus when pedal pressure is plotted against pedal travel the graph is regular and there are no sudden changes in the graph.

Further objects and features of our invention should be apparent after consideration of the subjoined specification and claims and of the attached drawings, in which:

Figure 1 is a view in perspective of an airplane equipped with brakes and with a brake regulating valve constructed according to our invention;

Figure 2 is a diagrammatic view showing the brake pedals, brake pressure controlling valves, brake pressure pump, brake pressure reservoir, brake pressure lines, and brakes of the airplane of Figure 1;

Figure 3:
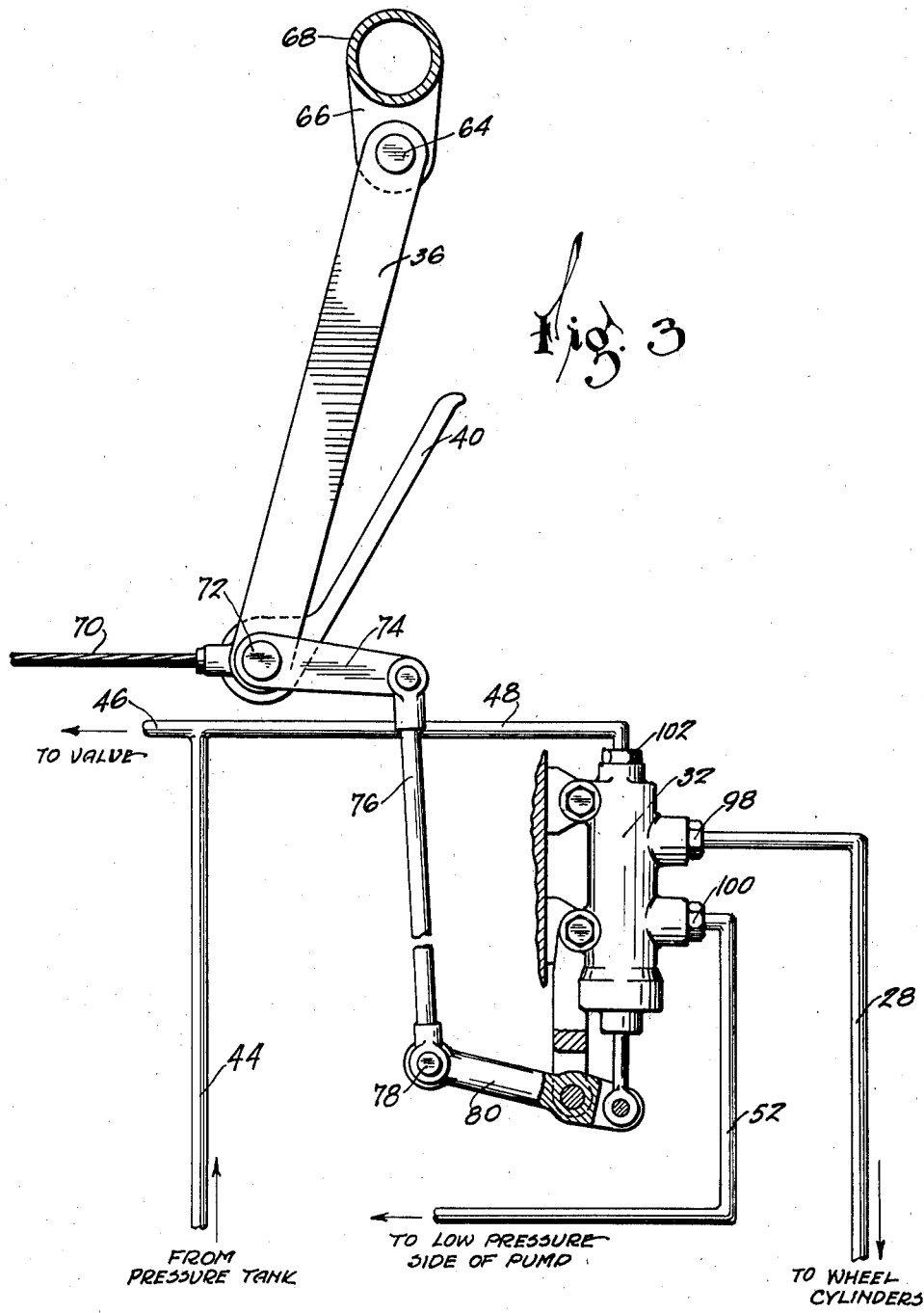
Figure 3 is a fragmentary view partially in side elevation and partially in vertical section showing one of the brake and rudder pedals, one of the brake regulating valves and a portion of the connecting conduits of Figure 2.

Referring specifically to the drawings, we have shown in Figure 1 an airplane equipped with a fuselage 10, wings 12, a rudder 14, and landing wheels 16; the landing wheels 16 are equipped with brakes 18 which are shown more fully in Figure 2. Each of the brakes comprises a drum 20 and shoes 22 arranged therein and spread into contact with the drum by a hydraulic wheel cylinder 24. Liquid under pressure is supplied to the wheel cylinders 24 by conduits 26 and 28 controlled through valves 30 and 32 respectively.

The rudder 14 is arranged to be controlled by rudder stirrups 34 and 36 in any convenient manner. Mounted on the rudder stirrup 34 is a brake pedal 38 and mounted on the rudder stirrup 36 is a brake pedal 40. The pedals 38 and 40 are arranged to control the valves 30 and 32 through suitable linkage, as shown, so that liquid under pressure may flow from a pressure tank 42 through conduits 44, 46 and 48, through valves 30 and 32, and conduits 26 and 28, to the wheel cylinders 24 when it is desired to apply the brakes. The valves 30, 32 may also be operated by the pedals 38 and 40 to allow liquid to flow back from the conduits 26 and 28 through conduits 50, 52 and 54 to a supply tank 56. From the supply tank the liquid is pumped by a pump 58, driven by electric motor 60 through conduit 62 to the pressure tank 42 where it is normally maintained under pressure.

The structure of the stirrups is shown more clearly in Figure 3 wherein, as may be seen, the stirrup 36 is pivoted as at 64 on a bracket 66 secured to shaft 68. A cable 70 leads from the stirrup 36 to the rudder 14. The brake pedal 40 is carried by a rotatable shaft 72 to which there is secured an arm 74 pivotally connected to a link 76, the lower end of which is pivotally connected at 78 to a lever 80 arranged to operate the valve 32.

Figure 4:
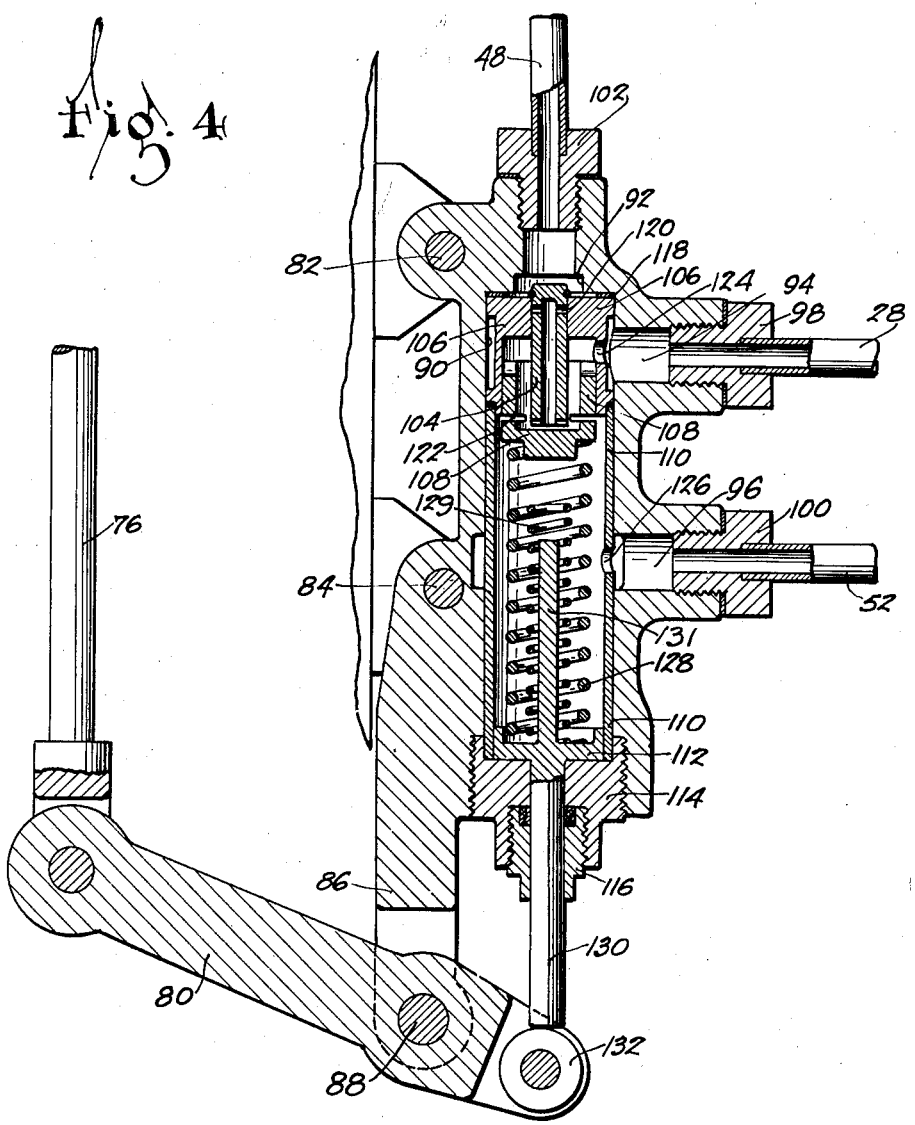
Figure 4 is a view in vertical section of our improved regulating valve as used in the structures shown in Figures 1, 2 and 3.

The valve 32 is shown more clearly in Figure 4. It is secured as at 82 and 84 to a fixed part of the airplane and is formed with a downwardly projecting bracket 86 on which the lever 80 is pivoted, as at 88. It is formed with bores 90 and 92 which form a valve casing and is provided with openings 94 and 96 into which the conduits 28 and 52 are secured by fittings 98 and 100 respectively. The upper end of the bore 92 has inserted therein a fitting 102 into which a conduit 48 extends. Within the bore 90, there are provided valve members 104, 106, 108, 110 and 112, the lower end of the bore being closed by a plug 114 and a gland 116. The valve member 106 is arranged adjacent the end of the bore 90 and bears against a washer 118 which contacts with the shoulder between the bores 90 and 92 and thus forms a seal. The member 106 and the washer 118 are secured by the sleeve member 110 which is in turn secured in place by the plug 114. The member 104 is formed with ports 120 which normally, as in the position shown, are blocked by a solid portion of the member 106. The valve member 108 is formed with slots 122 which normally, as in the position shown, allow liquid to flow from the brakes through a port 124 in the member 106 and through a port 126 in the sleeve member 110 back to the reservoir 56 by means of the conduit 52. A spring 128 is interposed between valve member 112 and the valve member 108 and movement of the valve member 112 is adapted to exert force on the member 108 through the spring 128 to move the valve member 108 to block the slots 122 and thus cut off the return of fluid from the brakes to the supply reservoir. Further movement of the member 112 acting through the spring 128 will, through the member 108, move member 104, so that liquid under pressure may flow from the conduit 48 through the ports 120 and through the port 124 and conduit 28 to the brakes. An auxiliary spring 129 augments the action of spring 128 to open the valve after a predetermined movement of the pedal. When both springs 128 and 129 are compressed an upstanding portion 131 of member 112 contacts the lower face of valve member 108 to complete a positive linkage between the foot pedal and valve member 108.

The member 112 is formed with a downwardly extending projection 130 which bears on a roller 132 secured to one end of the lever 80 so that movement of the brake pedal 48 will operate the valve.

In the operation of the braking system shown in Figures 1 to 4 inclusive, the pilot may press on one or both of the brake pedals 38 and 40 and thus rotate the pedal (clockwise as shown in Figure 3 for applying the brake), thus moving the associated link 76 downward and through the associated lever 80 apply force to the stem 130. This tends to compress the spring 128 and the spring 128 acting on the valve member 108 moves that member upward thus telescoping the member within the member 90 and cutting off the flow of liquid through the slots 122. Further movement causes the lower end of the member 108 to contact with the lower end of the member 104 and moving that member upward until the slots 120 are uncovered. Thereupon liquid flows from the inlet conduit 48 through the slots 120 and out the port 124 through the conduit 28 to the associated brake 24. The pressure on the liquid which is being exerted to apply the brakes reacts on the inner face of the member 108 and thus through the spring 128 upon the pedal. As the pressure builds up it tends to compress the spring and thus allows the member 104 to be moved downwardly to cut off the inlet ports 120 by reason of the telescoping of the member 104 and member 106. Greater braking pressure may be exerted by exerting more force upon the pedal and moving the member 130 upward so as to compress the spring 128 more and exert more force through the spring on the member 108. Release of pressure on the pedal allows the return of the member 112, thus relieving the pressure on the spring and allowing the valve member 108 to return to the position shown in which the liquid under pressure at the brakes may flow through the port 124, the slots 122, the port 126 and the conduit 52 back to the supply reservoir 56.

Figure 5:
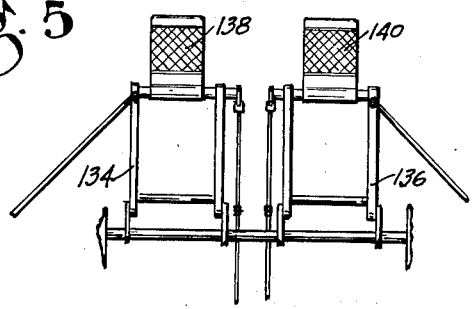
Figure 5 is a fragmentary view in elevation showing a modified form of rudder and brake pedals.
Figure 6:
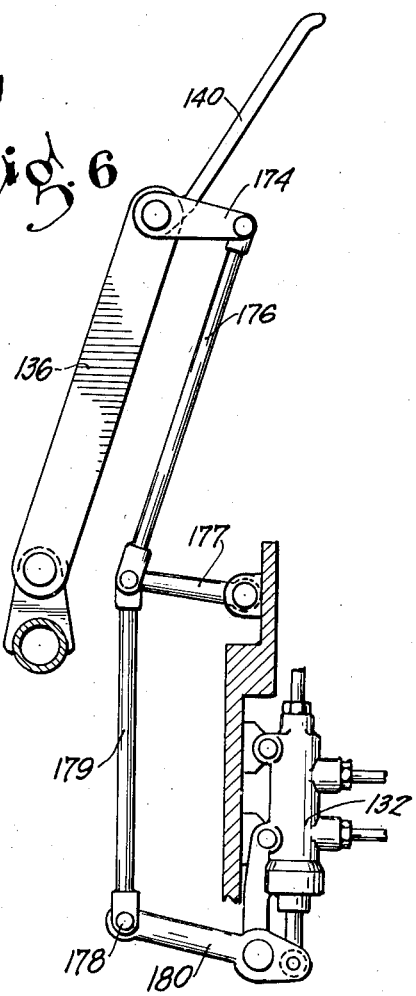
Figure 6 is a fragmentary view partially in side elevation and partially in section somewhat similar to the showing of Figure 3 but showing the modified arrangement of Figure 5.

In Figures 5 and 6, we have shown a slightly different arrangement of the pedals provided for controlling the breaking system. Therein the rudder stirrups 134 and 136 extend upward from their pivots and the brake pedals 138 and 140 are mounted above the rudder stirrups. The link 176 which is connected to the lever 174 is arranged parallel to the stirrup 136 and is supported by a link 177 connected to a fixed part of the airplane and is connected to the pivot point 178 by a floating link 179. The pivot 178 connects to the lever 180 which operates the valve 132 which is in all respects similar to the valve 32.

Figure 7:
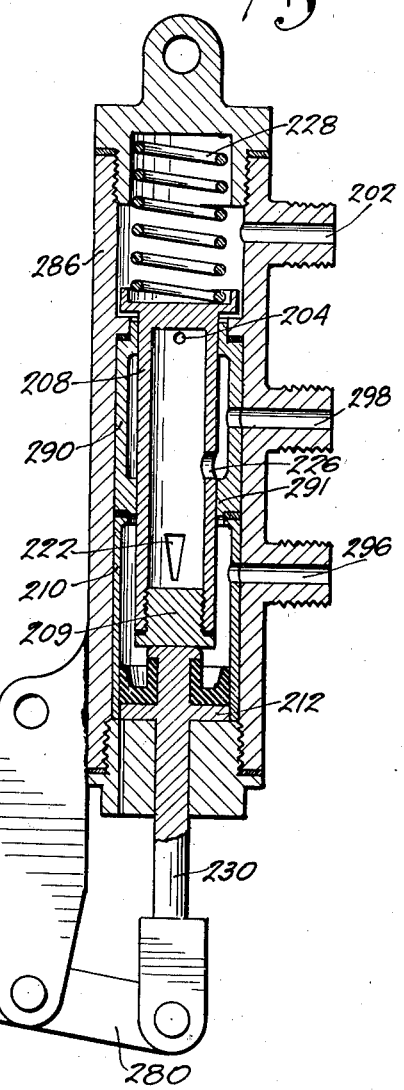
Figure 7 is a view in vertical section showing a modified form of valve, the view being along the lines of Figure 4.

In Figure 7, we have shown a different form of valve. Therein the lever 280 contacts with an extension 230 of the valve member 212. The valve member 212 as well as the valve members 210, 290 and 208, are all inclosed in the casing 286. Ports 202, 298 and 296 lead respectively to a source of fluid pressure to the brake operating cylinders and to the reservoir. Movement of the member 212 forces the member 208 upward against the spring 228 and fluid under pressure flowing in through the port 204 passes through the port 226 outward to the brakes and also to the reservoir through the slot 222 and the port 296. As the member 208 is moved upward the slot 222 is partially blocked by the projections 291 and greater pressure flows to the brake through 298. Because of the triangular shape of the slot 222, the pressure diverted to the brake can be better controlled. The force of the pressure being applied to the brake may be regulated because the pressure of the fluid flowing to the brake acts upon an area of the upper face of member 208, equivalent to the outer diameter of its main portion. This pressure is transmitted from member 208 through plug 209, forming a part thereof to member 212 and the linkage described above to foot pedal 140, thus giving the operator a sense of "feel."

The operation of this form of our invention is similar to the preferred form previously described except that as pointed out above, the method of obtaining reaction or feel on the pedal is slightly different.

It is to be understood that the above-described embodiments of our invention are for the purpose of illustration only and various changes may be made therein without departing from the spirit and scope of the invention.

We claim:

1. In a valve for controlling brakes, a casing, a lever provided adjacent to said casing, a plurality of valve elements in the casing including an operating element having a stem cooperating with said lever and including a plurality of piston valve elements having passages therethrough, the said piston valve elements cooperating with one another to control the opening and closing of the said passages, and means including one or more of said valve elements for creating a pressure on said lever corresponding to the pressure being exerted on said brakes.

2. In a valve for controlling brakes, a casing, a lever provided adjacent to said casing, a plurality of valve elements in the casing including an operating element having a stem cooperating with said lever, means including one or more of said valve elements for creating a pressure on said lever corresponding to the pressure being exerted on said brakes, a fixed valve element, and a pair of floating valve elements overlapping each other and overlapping said fixed valve element, normally spaced but contacting at times so that one may be moved by the other.

3. In a valve for controlling brakes, a casing, a lever provided adjacent to said casing, a plurality of valve elements in the casing including an operating element having a stem cooperating with said lever, means including one or more of said valve elements for creating a pressure on said lever corresponding to the pressure being exerted on said brakes, a fixed valve element, and a pair of floating valve elements extending through the fixed valve element and overlapping one another.

4. In a valve for controlling brakes, a casing, a lever provided adjacent to said casing, a plurality of valve elements in the casing including an operating element having a stem cooperating with said lever, means including one or more of said valve elements for creating a pressure on said lever corresponding to the pressure being exerted on said brakes, a pair of floating valve elements overlapping one another, and a spring interposed between said operating element and one of said floating elements.

5. In a valve for controlling brakes, a casing, a lever provided adjacent to said casing, a plurality of valve elements in the casing including an operating element having a stem cooperating with said lever, means including one or more of said valve elements for creating a pressure on said lever corresponding to the pressure being exerted on said brakes, a fixed valve element, a pair of floating valve elements extending through the fixed valve element, and a spring interposed between said operating element and one of said floating elements.

6. In a valve for controlling hydraulic brakes of an airplane, a casing, a lever provided adjacent to said casing, a plurality of valve elements in the casing including an operating element having a stem cooperating with said lever, means including one or more of said valve elements for creating a pressure on said lever corresponding to the pressure being exerted on said brakes, and a floating valve element formed with ports through which fluid under pressure enters, said floating valve element slidingly engaging a second of said valve elements and being arranged to seal said ports by bringing them into sliding contact with the interior of the said second valve element.

7. In a valve for controlling hydraulic brakes of an airplane, a casing, a lever provided adjacent to said casing, a plurality of valve elements in the casing including an operating element having a stem cooperating with said lever, means including one or more of said valve elements for creating a pressure on said lever corresponding to the pressure being exerted on said brakes, and a floating valve element formed with slots through which fluid under pressure escapes, said floating valve element slidingly engaging a second of said valve elements and being arranged to seal said slots by bringing them into sliding contact with the interior of the said second valve element.

8. In a valve for controlling hydraulic brakes of an airplane, a casing, a lever provided adjacent to said casing, a plurality of valve elements in the casing including an operating element having a stem cooperating with said lever, means including one or more of said valve elements for creating a pressure on said lever corresponding to the pressure being exerted on said brakes, a fixed valve element, a floating valve element formed with slots through which fluid under pressure escapes, and a spring interposed between said operating element and said floating element, said floating valve element slidingly engaging a second of said valve elements and being arranged to seal said slots by bringing them into sliding contact with the interior of the said second valve element.

9. In a valve for controlling brakes, a casing, a lever provided adjacent to said casing, a plurality of valve elements in the casing including an operating element having a stem cooperating with said lever, means including one or more of said valve elements for creating a pressure on said lever corresponding to the pressure being exerted on said brakes pivoted adjacent to said casing having a stem, a fixed valve element formed with an outlet port, a floating valve element formed with ports through which fluid under pressure enters, a floating valve element formed with slots through which fluid under pressure escapes, said floating valve elements being normally spaced but contacting at times so that one may be moved by the other, and extending through the fixed valve element, and a spring interposed between said operating element and one of said floating elements.

10. In a valve for controlling brakes, a casing having an intake port and a plurality of exhaust ports, a lever provided adjacent to said casing, a plurality of valve elements in the casing including an operating element having a stem cooperating with said lever, means including one or more said valve elements for creating a pressure on said lever corresponding to the pressure being exerted on said brakes, a fixed valve element, a plurality of floating valve elements, the said valve elements having passages therethrough arranged to control the communication of the intake port with the exhaust ports and the said valve elements having sliding contact with one another so that their movement controls the opening and closing of the said passages.

11. In a valve for controlling brakes, a casing, a lever provided adjacent to said casing, a plurality of valve elements in the casing including an operating element having a stem cooperating with said lever, means including one or more of said valve elements for creating a pressure on said lever corresponding to the pressure being exerted on said brakes, a fixed valve element, a floating valve element having an inlet port, and a floating valve element having an exhaust port, one of said valve elements being adapted to at times close one or both of the aforesaid ports.

12. A brake control valve comprising a fixed valve element, a floating valve element slidable within the said fixed valve element and having a port closed at times by the said fixed valve element, a second floating valve element slidable within the first floating valve element and having a port arranged to be closed at times by said first floating valve element, and means for controlling the movement of said floating valve elements.

13. A control valve for brakes comprising a floating valve element having an inlet port therein, a second floating valve element having an exhaust port therein, a fixed valve element adapted to seal one or both of the inlet and exhaust ports, means for balancing the first floating element during application of the brakes, and means for balancing the second floating element during release of the brakes, said valve elements being arranged to at times contact one another and move simultaneously.

FREDERICK C. FRANK.
WILLIAM H. DU BOIS.